T. A. RYAN.
VEHICLE WHEEL.
APPLICATION FILED MAR. 17, 1914.
1,205,790.
Patented Nov. 21, 1916.
3 SHEETS—SHEET 1.
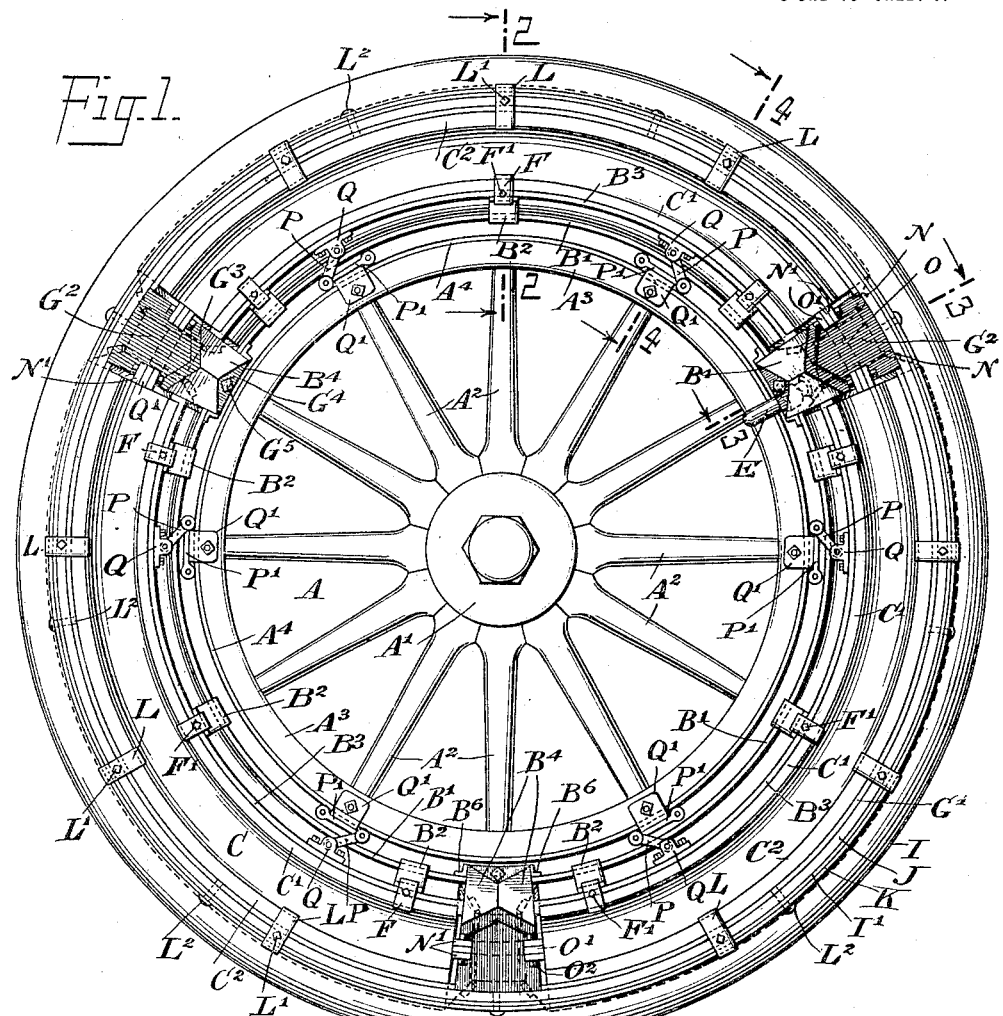
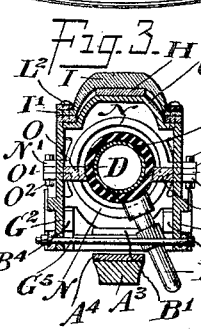
WITNESSES
INVENTOR
Thomas A. Ryan
BY
ATTORNEYS

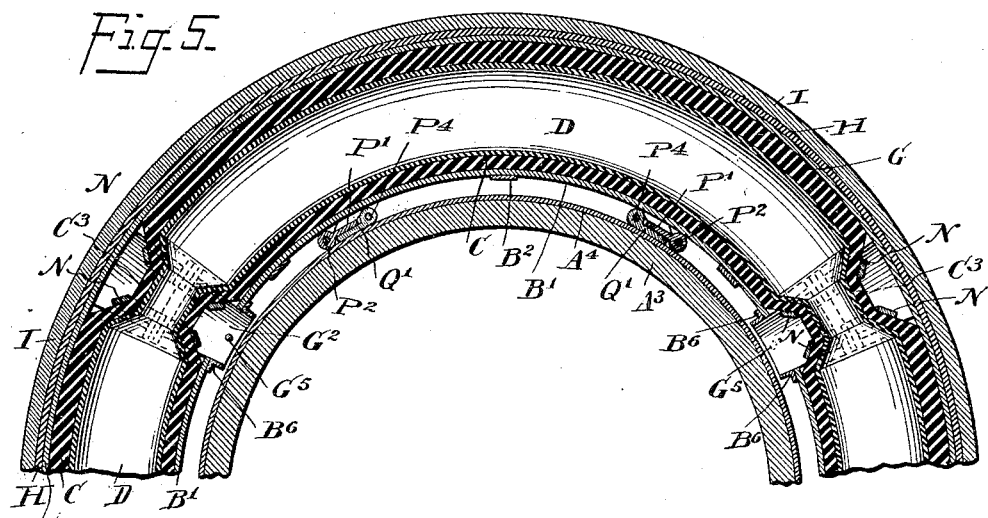
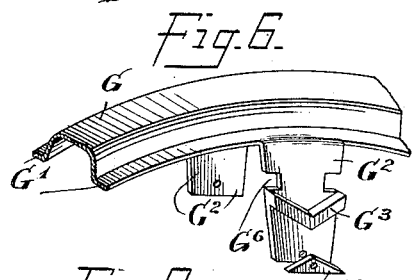
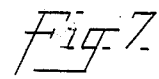
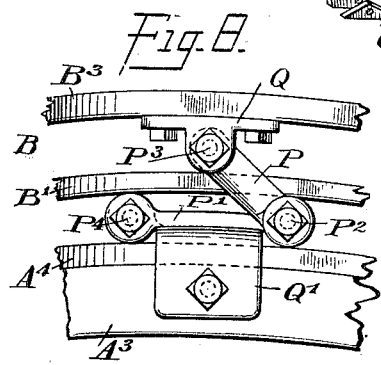
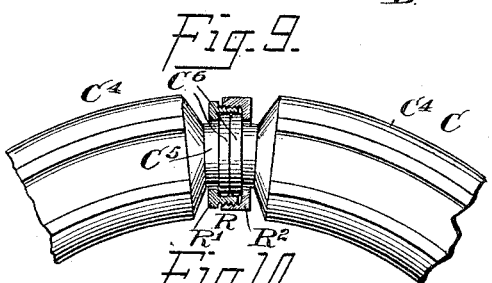
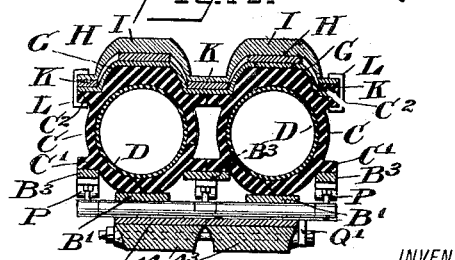

T. A. RYAN.
VEHICLE WHEEL.
APPLICATION FILED MAR. 17, 1914.

1,205,790.

Patented Nov. 21, 1916.
3 SHEETS—SHEET 3.

WITNESSES
George L. Blume,

INVENTOR
Thomas A. Ryan
BY
ATTORNEYS

UNITED STATES PATENT OFFICE.

THOMAS A. RYAN, OF YONKERS, NEW YORK.

VEHICLE-WHEEL.

1,205,790.

Specification of Letters Patent.

Patented Nov. 21, 1916.

Application filed March 17, 1914. Serial No. 825,276.

*To all whom it may concern:*

Be it known that I, THOMAS A. RYAN, a citizen of the United States, and a resident of Yonkers, in the county of Westchester and State of New York, have invented a new and Improved Vehicle-Wheel, of which the following is a full, clear, and exact description.

The invention relates to wheels for automobiles, bicycles and other vehicles, such, for instance, as shown and described in the application for Letters Patent of the United States, Serial No. 640,450, filed by me on July 25, 1911.

The object of the present invention is to provide a new and improved vehicle wheel having a well protected cushioning tube to render the tire puncture-proof, at the same time providing the desired cushioning effect to insure easy riding of the occupants of the vehicle, the load being equally well distributed around the tube so that the pressure is practically equal at the top, bottom and sides.

In order to accomplish the desired result use is made of a wheel center provided with a rim, a solid tread having inwardly-extending arms, an annular sectional frame having bearings on the said arms, a cushioning tube interposed between the said solid tread and the said frame and having reduced portions straddled by the said arms, and spreading links connecting the said frame with the said wheel center rim.

A practical embodiment of the invention is represented in the accompanying drawings forming a part of this specification, in which similar characters of reference indicate corresponding parts in all the views.

Figure 11:
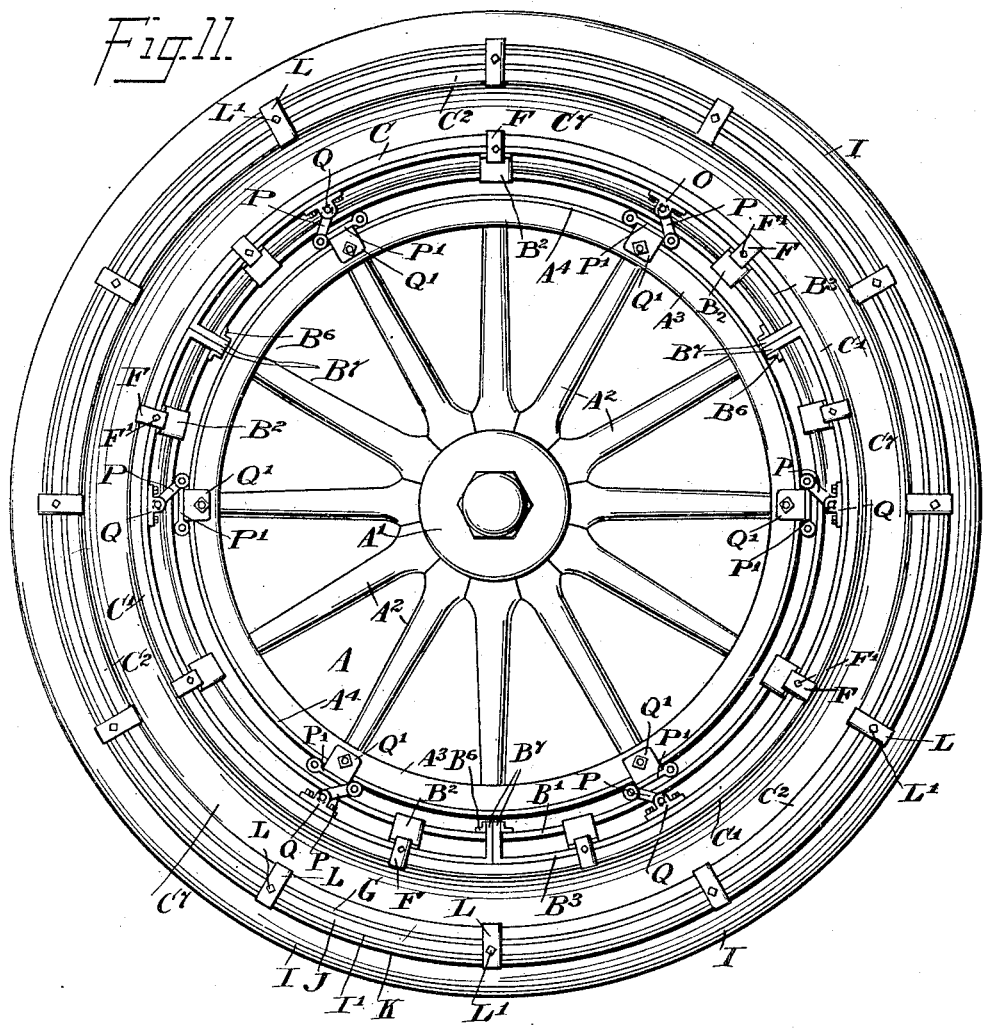
Figure 12:
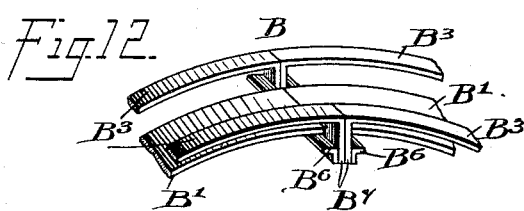

Figure 1 is a side elevation of the improved vehicle wheel; Fig. 2 is a transverse section of the same on the line 2—2 of Fig. 1; Fig. 3 is a similar view of the same on the line 3—3 of Fig. 1; Fig. 4 is a like view of the same on the line 4—4 of Fig. 1; Fig. 5 is an enlarged sectional side elevation of part of the vehicle wheel; Fig. 6 is a perspective view of a portion of the solid tread and arms; Fig. 7 is a perspective view of one end of the frame section; Fig. 8 is an enlarged side elevation of one of the spreading link connections between the rim of the wheel center and the sectional frame; Fig. 9 is a side elevation of a portion of a cushioning tube made in sections and showing the coupling between adjacent tube sections, the coupling being shown in section; Fig. 10 is a cross section of a modified form of the vehicle wheel designed for heavy trucks and showing the use of two solid treads and cushioning tubes; Fig. 11 is a side elevation of a modified form of the vehicle wheel; and Fig. 12 is a perspective view of part of the sectional frame of the vehicle wheel shown in Fig. 11.

The solid center A of the vehicle wheel consists of the usual hub A′, radial spokes $A^2$ and a rim $A^3$ having a metallic facing $A^4$ on its peripheral surface. A sectional frame B is arranged concentric with the rim $A^3$ and is spaced therefrom to move into eccentric position relatively to the center A when subjected to a load acting on the center A. Each of the sections of the frame B consists of a segmental plate B′ connected by spaced cross bars $B^2$ with side plates $B^3$ (see Figs. 2 and 7) terminating at each end in spaced sets of wedge-shaped blocks $B^4$, $B^5$ rigidly connected with each other by a cross bar $B^6$ of angle iron and to which the corresponding end of the plate B′ is secured. On the plates B′ of the frame B is seated a cushioning tube C which may be made of a single tube or in the form of a split shoe containing an inflatable inner tube D provided with a valve E (see Fig. 3) for inflating the said inner tube D in the usual manner. The cushioning tube C is provided on its sides with annular integral flanges C′ resting on the plates $B^3$, and the said flanges C′ and the terminals of the cross bars $B^2$ are engaged by U-shaped clips F fastened to the plates $B^3$ by bolts F′ or other fastening devices.

The outer peripheral portion of the cushioning tube C is preferably thickened, as plainly shown in Fig. 2, and on this thickened portion fits a tread plate G, U-shaped in cross section and terminating in outwardly-extending flanges G′ (see Figs. 2 and 6) resting on annular flanges $C^2$ projecting integrally and outwardly from the sides of the cushioning tube C and concentric with the flanges C′ previously mentioned. On the plate G is fitted exteriorly a ring H covered by an outer annular tread I, made U shape in cross section, and having outwardly-extending flanges I′. The flanges I′ rest on rings J which in turn rest on the flanges G′, and on the flanges I′ rest rings K engaged by clips L, U-shaped in cross section and having their inner members engaging the flanges $C^2$. The clips L are secured by bolts L′ or other fastening devices to the rings J. The flanges G' and I' and the rings J and K are preferably fastened together by bolts or rivets L² to form a solid structure of the plates G and I with the ring H held between the same.

It is understood that the parts just described constitute the solid tread of the vehicle wheel and it protects the outer portion of the cushioning tube C to prevent the latter from being punctured.

The cushioning tube C is provided with contracted or reduced portions C³ and the inner tread plate G is provided at its flanges G' with inwardly-extending arms G² straddling the reduced portions C³ of the cushioning tube C. The outer faces of the arms G² are provided with V-shaped bearings G³, G⁴, of which the bearings G³ are integral on the arms G² while the bearings G⁴ are removably secured thereto by bolts G⁵. The blocks B⁴ of the sectional frame B fit between the bearings G³, G⁴, and the blocks B⁵ fit against the inner faces of the arms G². By the arrangement described the sections of the frame B are supported by the bearings on the arms G² of the tread plate G to allow the plates B', B³ of the frame B to yield when the wheel is under a load, as hereinafter more fully explained. The inner ends of the arms G² are guided on the cross bars B⁶ of the frame B, as indicated in Fig. 5.

In order to hold the cushioning tube C in position on the tread, use is made of two-part clamping bands N fitting around the reduced portions C³ and having flanges N' projecting through notches G⁶ formed in the arms G² (see Figs. 3 and 6). Lengthwise-extending bars O are arranged on the inner faces of the arms G² and are provided with flanges O' also extending through the notches G⁶ for the flanges N' to abut against, the several flanges N' and O' being fastened together by bolts O² or other fastening devices.

Each section of the frame B is connected with the rim A³ by two or more spreading link connections each formed of pairs of links P and P' pivotally connected with each other at P², as plainly indicated in Figs. 1 and 8, see also Fig. 4. The links P are pivotally connected at P³ to brackets Q bolted or otherwise fastened to the inner face of the corresponding side plates B³ of the frame B, and the links P' are pivotally connected at P⁴ to brackets Q' bolted or otherwise secured to the rim A³ of the wheel center A. Normally the links P' rest on the brackets Q' while the links P are at an angle, as plainly shown in Figs. 1 and 8.

It will be seen that as the wheel rim A³ is movable to an eccentric position with respect to the frame B, as before stated, and as the said frame consists of several sections B' before stated as yieldably supported at their ends by the arms G², the wheel A is readily movable to an eccentric position with respect to the solid tread before described, so that the load applied to the hub A' of the wheel center A causes the links P, P' to force the sections of the frame B outward against the cushioning tube C at all points around the inner surface thereof, so that the tube is pressed outward or around against the tread plate G of the solid tread, thus distributing the load equally all around the cushioning tube C.

When assembling the vehicle wheel the bolts G⁵ and guide blocks G⁴ are removed from the arms G², and then the deflated cushioning tube is placed in position in the tread plate G, after which the bolt G⁵ and guide blocks G⁴ are replaced on the arms G². The clamps L are now placed in position after which the cushioning tube with the tread thereon is placed in position on the frame B. The clamps F are next engaged with the flanges C' and the cushioning tube is then inflated to securely fasten the composite tread and the frame B in position on the cushioning tube.

It is understood that the outer tread plate I is the wearing tire and can be readily replaced when worn out. The rings H and J serve to space the plates G and I apart.

The cushioning tube C may be made in sections C⁴, as shown in Fig. 9, each section terminating in a reduced portion C⁵ having an annular flange C⁶ abutting against the annular flange C⁶ of the next adjacent section. The abutting flanges C⁶ are fastened together by a coupling R, preferably made in two parts R', R² screwed together to clamp the ends of the sections C⁴ firmly together.

For heavy trucks the wheel is provided with two cushioning tubes C, as indicated in Fig. 10, the tubes being provided with connected solid treads and the frames B are connected by link connections with the rims A³ of a double wheel center A, the said rims having a facing A⁴ on both rims.

In the modified form shown in Figs. 11 and 12, the cushioning tube C⁷ is of uniform diameter throughout, and the arms G² of the tread plate G and the blocks B⁴, B⁵ of the sectional frame B are omitted, and the side rings B³ are simply provided at their ends with inwardly-extending abutting flanges B⁷ to which the cross bars B⁶ are secured, otherwise the construction is the same as above described in reference to the separate wheel shown in Figs. 1 to 8.

Having thus described my invention, I claim as new and desire to secure by Letters Patent:

1. A vehicle wheel having a wheel center, a solid tread, an annular sectional frame, a cushioning tube interposed between the said tread and frame and to which the said tread and frame are attached, and link connections connecting the said sections of the said frame to the said wheel center.

2. A vehicle wheel having a wheel center provided with a rim, a solid tread, a sectional frame, a cushioning tube interposed between the said tread and frame and having annular flanges, fastening means engaging the said tread and one of the said cushioning tube flanges to fasten the tread and cushioning tube together, and fastening means engaging the said frame and the other flange of the cushioning tube to fasten the said frame and cushioning tube together.

3. A vehicle wheel having a wheel center, a cushioning tube, a solid tread fitting on the outer face of the said cushioning tube and secured to the latter, a sectional bearing frame onto which fits the said cushioning tube, and pairs of connected links connecting each of the said frame sections with the said wheel center.

4. A vehicle wheel having a cushioning tube provided with integral inner and outer laterally projecting flanges, a solid tread fitting onto the outer peripheral face of the tube and attached to the outer flanges, and a sectional band frame for the cushioning tube secured to the inner flanges and upon which the inner peripheral face of the tube is seated.

5. A vehicle wheel having a cushioning tube provided with integral laterally projecting flanges, and a sectional bearing frame for the said cushioning tube to rest on and attached to the said flanges.

6. A vehicle wheel having a cushioning tube provided with outer laterally projecting flanges near the outer peripheral face of the cushioning tube and provided with inner laterally projecting flanges spaced inward from the said outer flanges, said flanges being respectively adjacent and spaced from the outer and inner peripheral faces of the tube, a solid tread fitting on the outer peripheral face of the said cushioning tube and secured to the said outer flanges, and a bearing frame secured to the said inner flanges and on which the inner peripheral face of said cushioning tube is seated.

7. A vehicle wheel having a cushioning tube provided with outer side flanges near the outer peripheral face of the cushioning tube and provided with inner side flanges spaced inward from the said outer side flanges, a solid tread fitting on the peripheral face of the said cushioning tube and secured to the said outer side flanges, a bearing frame secured to the said inner side flanges and on which the said cushioning tube is seated, a wheel center, and pairs of links independently connecting the sections of said bearing frame to the said wheel center.

8. A vehicle wheel having a wheel center, a solid tread provided with inwardly-projecting arms having bearings, a bearing frame made in sections, each section having end blocks fitting the said bearings, a cushioning tube interposed between the said tread and frame, and links connecting each frame section with the said wheel center.

9. A vehicle wheel having a wheel center, a solid tread provided with inwardly-projecting arms having bearings, a bearing frame made in sections, each section having end blocks fitting the said bearings, a cushioning tube interposed between the said tread and frame, the said cushioning tube having outer and inner integral side flanges, fastening means for fastening the said tread and the said frame sections to the said cushioning tube flanges, and links connecting each frame section with the said wheel center.

10. A vehicle wheel having a wheel center, a solid tread provided with inwardly-projecting arms having bearings, a bearing frame made in sections, each section having end blocks fitting the said bearings, a cushioning tube interposed between the said tread and frame, the said cushioning tube having diametrical reduced portions straddled by the said arms of the solid tread, and links connecting each frame section with the said wheel center.

11. A vehicle wheel having a wheel center, a solid tread provided with inwardly-projecting arms having bearings, a bearing frame made in sections, each section having end blocks fitting the said bearings, a cushioning tube interposed between the said tread and frame, the said cushioning tube having diametrical reduced portions straddled by the said arms of the solid tread, sectional supporting rings encircling the said reduced tube portions and having flanges, attaching bars extending along the inner faces of the said arms and having flanges to which the said ring flanges are secured, the said arms having notches through which extend the said connected flanges, and links connecting each frame section with the said wheel center.

12. A vehicle wheel having a cushioning tube provided with integral side flanges, an annular tread plate fitting the peripheral face of the said cushioning tube and having side flanges resting on the said cushioning tube flanges, a ring overlying the said tread plate, an outer annular tread plate overlying the said ring and having side flanges, side rings interposed between the flanges of the said tread plates, side rings overlying the flanges of the said outer tread plate, and clips engaging the said side rings and the flanges of the said cushioning tube.

13. A vehicle wheel having a cushioning tube provided with integral side flanges, a bearing frame for the said cushioning tube and made in sections, each section having a central plate fitting against the under side of the said cushioning tube, side plates fitting against the under side of the said integral side flanges of the cushioning tube and cross bars connecting the said central plate with the said side plates, and clips held on the said side plates and engaging the said cross bars and the top of the said integral flanges of the cushioning tube.

14. A vehicle wheel having a cushioning tube provided with diametrical reduced portions, a solid tread fitting onto the peripheral face of the said cushioning tube and having inwardly-extending arms straddling the said reduced portions of the cushioning tube, the said flanges having notches, sectional rings encircling the said reduced portions and having flanges extending through the said notches, bars extending along the inner faces of the said flanges and having flanges extending through the said notches, and fastening means for fastening the said ring flanges and bar flanges together on the outer face of the said arms.

In testimony whereof I have signed my name to this specification in the presence of two subscribing witnesses.

THOMAS A. RYAN.

Witnesses:
GEO. STARM COWLES,
THEO. G. HOSTER.

Copies of this patent may be obtained for five cents each, by addressing the "Commissioner of Patents, Washington, D. C."